United States Patent Office 3,719,745
Patented Mar. 6, 1973

3,719,745
COARSE, LIGHT SODIUM CARBONATE
Walter C. Saeman, Hamden, Conn., assignor to
Olin Corporation
Continuation-in-part of application Ser. No. 915, Jan. 6,
1970. This application Oct. 19, 1970, Ser. No. 81,700
The portion of the term of the patent subsequent to
Mar. 7, 1989, has been disclaimed
Int. Cl. C01b 7/38
U.S. Cl. 423—421                       11 Claims

ABSTRACT OF THE DISCLOSURE

Coarse, granular, free-flowing low-density sodium carbonate and sodium carbonate-sodium bicarbonate mixtures in the form of substantially hollow beads having an apparent density of 15 to 40 pounds per cubic foot are prepared from a sodium bicarbonate product produced in the form of hollow beads having an apparent density of 20 to 45 pounds per cubic foot. The hollow beads of sodium bicarbonate are produced by hydrating light soda ash (sodium carbonate) to form particles of the desired final size, carbonating in the presence of free moisture to produce a bicarbonate-containing intermediate, volatilizing the liberated moisture and recovering coarse, granular, free-flowing, dust-free, low-density sodium bicarbonate. The hollow beads of sodium bicarbonate on calcination produce hollow beads of sodium carbonate having an apparent density of 15 to 30 pounds per cubic foot. To produce granular sodium carbonate having an apparent density of 25 to 40 pounds per cubic foot, lower density beads are moistened with sodium carbonate solution and re-dried. The calcined sodium carbonate products and carbonate-bicarbonate products have particular utility in detergent compositions.

---

Figure 1:
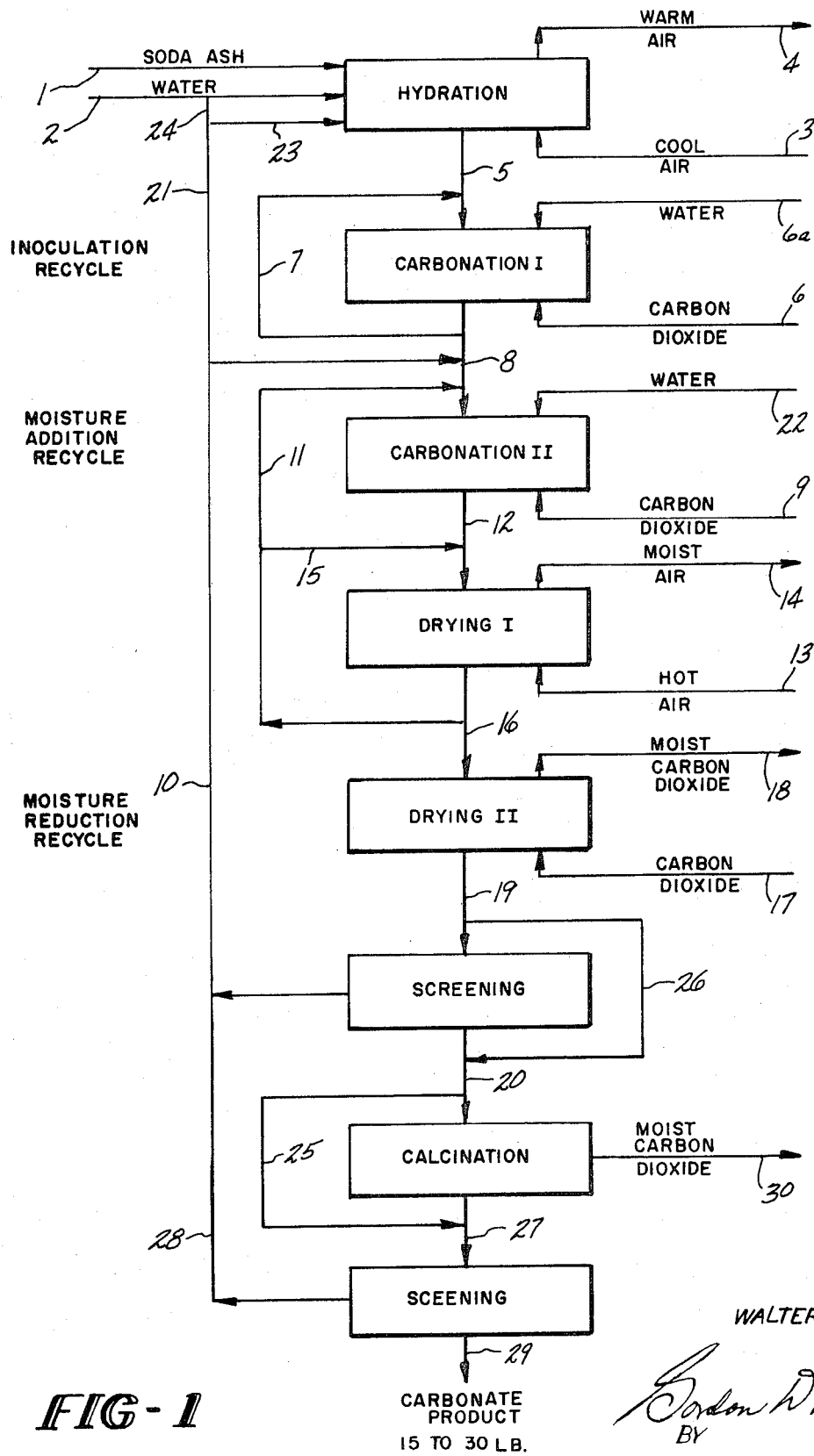

This application is a continuation-in-part of copending application, U.S. Ser. No. 915, filed Jan. 6, 1970, now U.S. Pat. No. 3,647,365, issued Mar. 7, 1972.

This invention relates to the production of coarse, granular, free-flowing, low-density sodium carbonate and sodium carbonate-sodium bicarbonate mixtures. The process of this invention is an extension of the process of the above-identified Ser. No. 915 in that the coarse, granular, free-flowing, low-density sodium bicarbonate in the form of substantially hollow bead produced in that prior process are subsequently heated to volatilize all or part of the carbon dioxide in excess of that required for sodium carbonate. The resulting sodium carbonate or carbonate-bicarbonate mixtures retain the same physical form of the hollow bead structure for compositions containing $Na_2CO_3$ only or mixtures of $Na_2CO_3$ with $NaHCO_3$. The low density, dust-free, granular carbonate of this invention is of specific utility as an ingredient in the composition and formulation of detergents and for other uses.

Sodium carbonate is produced commercially from sodium bicarbonate which is in turn produced in the ammonia-soda process by carbonating an ammoniacal solution of sodium chloride to precipitate crude bicarbonate. This ammonia-contaminated bicarbonate is calcined to volatilize the residual ammonia, to remove carbon dioxide and to produce sodium carbonate (light ash). Sodium carbonate is also produced commercially from natural trona by calcination and purification steps. Sodium carbonate is available commercially in relatively dense granular forms known as "dense ash" and also in low-density, finely-divided, dusty forms generally referred to as "light ash." Of these, various commercial forms of sodium carbonate the "light ash" is the cheapest.

Economically, the preferred starting material for the production of the coarse, low-density sodium carbonate of this invention is the commonly available commercial form of sodium carbonate known as light ash. It usually has a mesh size through 100 mesh. "Dense ash" is also suitably transformed into the product of the present invention if desired.

One object of this invention is to transform low-cost, low-density, dusty "light ash" into low cost, low-density, dust-free, coarse, granular sodium carbonate and mixtures of sodium carbonate and sodium bicarbonate.

It is, therefore, a principal object of this invention to produce from fine, dry soda ash a coarse, low-density sodium carbonate in which the particle size may be selectively chosen in the range of from 4-mesh to 100-mesh U.S. Standard screens and the bulk density may be selectively chosen in the range 15 to 40 lbs./ft.$^3$ A further object of this invention is to produce the said material at high rates in compact and economical conversion equipment.

Another object of this invention is to provide a process in which material failing to meet desired product specifications is readily and economically recycled and reprocessed for conversion into the desired size.

Another object of this invention is to provide a process in which intermediate products are insensitized to exposure to elevated temperatures during drying permitting rapid and economical drying rates.

A still further object of this invention is to produce sodium bicarbonate for conversion to carbonate using low cost heating, cooling and evaporation loads as compared to the heating, cooling and evaporation loads used for producing sodium bicarbonate by crystallization from saturated solutions.

Another object of this invention is to produce sodium carbonate in hard, dust-free form.

Finely divided dusty forms of sodium carbonate can be formed into larger dust-free particles by agglomerating the sodium carbonate in the presence of a carefully controlled amount of water. The anhydrous soda ash readily combines with water at low temperatures to produce hydrated forms of soda ash. Thus, at temperatures below 32° C. the stable hydrate contains 10 moles of water per mole of ash; from 32° C. to 35.4° C. the stable hydrate has 7 moles of water per mole of ash. From 35.4° C. to 109° C., the monohydrate is the stable hydrate. Under controlled conditions, the fine ash is agglomerated to produce granules of any desired size. The density of the hydrated granules depends on the ratio of water to ash. In the decahydrate the weight ratio of water to ash is 1.7/1.0; in the heptahydrate the ratio is 1.2/1.0 and in the monohydrate the ratio is 0.17/1.0. If the $H_2O/Na_2CO_3$ ratio exceeds the limiting values indicated, an excess of solution accumulates at the surface of the particles and this in turn bonds additional amounts of lower hydrated ash to the higher hydrated nucleus or seed particles. Mixtures of the deca-, hepta- and monohydrates can therefore be made containing any ratio of water to ash from monohydrate to decahydrate. As this water is volatilized from the final product the bulk volume of the solid hydrate originally formed remains approximately the same while the weight of the product is decreased by the weight of the water volatilized. Thus a wide range of bulk densities are made using an appropriate ratio of water to ash. Uniform application of water to the soda ash in order to hydrate and agglomerate is readily effected, for example, by tumbling the ash in a horizontal rotary drum while introducing water by spraying. The rate of ash transport through the drum is preferably quite rapid in relation to fine ash feed so that the increase in diameter of the grains per pass through the drum is approximately 20 percent of the final desired size. Partially agglomerated material leaving the drum is suitably screened to separate the desired grain size for the final product. Undersized grain is recycled through the drum for additional agglomeration until the desired product size is attained. Growth increments per pass through the drum may be in excess of the indicated 20 percent but as this increment is made larger the proportion of oversize material also increases.

These hydrates in the desired size are also suitably formed by crystallization from saturated solutions of soda ash.

One prior art method for preparing low density, granular sodium carbonate from hydrated ash is to carefully volatilize the water of hydration to a sufficient degree below the fusion or decomposition temperature of the hydrate so that the physical form of the hydrated particle is retained intact in the dehydrated particle. For example, the bulk of the water of hydration of the heptahydrate must be removed below 35.4° C. to avoid loss of the physical structure of the heptahydrate. The vapor pressure of water above the heptahydrate at temperatures below 35.4° C. is so low that this is a slow and costly process. This process affords no means for producing mixtures of sodium carbonate with sodium bicarbonate. The preudomorph of the hydrated structure remaining after dehydration is soft, chalky, and easily abraded into very fine dust. It is not commercially acceptable as a dust-free, granular, low-density form of sodium carbonate unless it is hardened by some supplementary treatment.

Another disadvantage of this agglomeration process is that, to be economical, the agglomeration must be conducted with the very minimum $H_2O/Na_2CO_3$ ratio which is effective to agglomerate the soda ash. For example, the $H_2O/Na_2CO_3$ mole ratio is preferably less than 1.5 for dehydration at temperatures of 35.4° C. to 109° C. This permits more rapid dehydration due to higher drying temperature without total fusion of the monohydrate. This choice of agglomeration and dehydration conditions, however, severely limits the minimum density of the dehydrated products since 133 parts by weight of hydrate loses only 27 parts by weight and produces 106 parts by weight of anhydrous ash. The initial density of the hydrated agglomerate is typically 45 lbs./ft.$^3$ and the final density cannot be less than 36 lbs./ft.$^3$. This does not meet the needs of the detergent industry for low-density, granular carbonates below 30 lbs./ft.$^3$ bulk density.

The coarse grains of hydrated ash are at least partially converted to grains of sodium bicarbonate by carbonation. The hydrated ash absorbs carbon dioxide at commercially economical rates only in the presence of some free moisture. Free moisture in the hydrated ash is formed by heating the hydrate to the transition temperature to the next lower hydrate or by introducing water, aqueous solutions or damp solids in amounts exceeding that needed to form the next higher stable hydrate. Recycle of partially carbonated hydrated ash is another means of providing the necessary amount of free moisture to induce rapid absorption of the $CO_2$. Once the process of $CO_2$ absorption has been initiated, conversion of sodium carbonate to sodium bicarbonate releases the water from the hydrated ash. Water not required to form the bicarbonate provides free water in the mixture and the amount progressively increases until carbonation is complete.

In mixtures containing more than 7 moles of water per mole of soda ash, the amount of free water released by total carbonation to bicarbonate is sufficient to cause further agglomeration in the damp mass. The bicarbonate product does not meet the desired final grain size in the carbonated product. It is necessary to reduce the free moisture content to less than the amount which results in further aggregation of the mass of solids in the carbonator. Intermediate drying of the partially carbonated hydrated ash or other moisture-reducing procedures, for example, recycle of dry carbonated product or fines, are alternate methods of reducing the free moisture content.

Hydrate formation does not occur with sodium bicarbonate and this compound exists only as the anhydrous solid under normal operating conditions. At sufficiently elevated temperatures, however, the bicarbonate tends to lose some carbon dioxide.

The weight of carbon dioxide added during carbonation partly compensates for the loss of water of hydration. In carbonating ash, the required water to soda ratio is 0.17/1 and the $CO_2$ to soda ratio is 0.415/1. The weight gain due to carbonation is therefore 0.585/1 and the weight loss of water of hydration from the decahydrate is 1.7/1. The net loss in weight by carbonation and dehydration of the decahydrate is therefore 1.115/1 or more than 55 percent of the initial weight of the hydrated ash.

The final density of the bicarbonate product depends in part on the water/ash ratio in the hydrated ash which is variable as described above and in part on the temperature and free moisture concentrations prevailing during carbonation. It is important to maintain the free moisture content below 30 percent but, in the range from 0.001 to 30 percent, it is suitably controlled to produce a final product of the desired apparent density. Basis for these practical considerations are believed to lie in the following discussion of the mechanics of formation of sodium bicarbonate in the form of hollow beads but it is not intended to limit the invention thereby. The hollow beads of bicarbonate are believed to be formed in four stages:

Stage 1.—In the initial contact of $CO_2$ with hydrated soda ash, the formation of a shell of trona on the surface of the grain of hydrated soda ash is endothermic and results in a lowering of the grain temperature. The formation of this shell reduces the rate of access of the $CO_2$ to the interior of the grain. Subsequent interaction between the grain and the $CO_2$ atmosphere is then restricted largely to the complete conversion of the superficial shell of trona to bicarbonate. This latter reaction is exothermic and results in a progressive increase in the temperature of the grain.

Stage 2.—As the grain temperature passes the transition temperature of heptahydrate at 35.4° C., the hydrate still remaining in the core of the grain separates into solid monohydrate and a saturated solution of sodium carbonate. The outer shell of trona or bicarbonate remains intact in view of its insensitivity to the 35.4° C. transition temperature of the heptahydrate. The solution bleeds from the core through the shell by capillarity. On contact with $CO_2$ at the surface of the shell, additional layers of sodium bicarbonate form until all the liquid leaves the core and is completely carbonated at the surface. The free moisture of the bed increases rapidly in this stage and it is maintained below 30 percent by the means described below to avoid balling or caking.

Stage 3.—As the free moisture is removed, the porisity of the shell increases and diffusion of $CO_2$ to the interior of the grain increases until the monohydrate in the interior is completely carbonated to sodium bicarbonate. At this stage the damp beads are weak and require gentle handling.

Stage 4.—Finally the free moisture is completely removed without disintegrating the hollow bead product. As the moisture is removed the physical strength of the beads increases to form a final bead which is sturdy to shipping and handling.

Formation of hollow beads of sodium bicarbonate is promoted by rapid carbonation to form the initial shell, rapid diffusion of liquid from the core at temperatures above 35.4° C. and rapid carbonation at the surface combined with rapid removal of free moisture to prevent agglomeration.

Carbonation is suitably, though not necessarily, divided into at least two stages to avoid liberation of free moisture sufficient to cause any substantial further aggregation or balling of the material in the tumbling bed. In carbonating heptahydrate at temperatures below 35.4° C., more than 50 percent of the total $CO_2$ required can be injected without encountering any undesirable aggregation. Greater proportions of $CO_2$ are suitably injected into monohydrate and mixtures of mono and heptahydrate in the initial stage. Less than 50 percent of the total $CO_2$ required is preferably injected into mixtures of heptahydrate and decahydrate.

In a particularly advantageous mode of practicing the invention, the heptahydrate or decahydrate or mixtures thereof, formed in the desired final size distribution, are first carbonated to the extent of at least about 5 percent at temperatures below the 35.4° C. transition temperature of the hydrate when the mixture contains principally heptahydrate and 32° C. when the mixture contains substantial amounts of decahydrate to form a shell of trona on the hydrate particles which prevents aggregation. Then the carbonation is continued at temperatures above 35.4° C. and the bicarbonate product is finally dried.

The carbonation gas introduced is suitably carbon dioxide or mixtures of carbon dioxide and inert gas, for example, nitrogen or air in any desired proportions. Advantageously, the carbonation gas is dry and suitably it is a recycle mixture of air and carbon dioxide which has been dried, and if necessary, refortified with carbon dioxide and warmed, for example, to 40° C. or higher. Carbonation in two stages with intervening drying is usually not necessary when using warm, dry mixtures of air and carbon dioxide. Carbonation and drying occur simultaneously in a single stage without aggregation and carbonation suitably continues to completion without interruption. If desired, however, the partially carbonated mixture is reduced in moisture content to less than 30 percent free moisture by any suitable means, for example, vaporizing moisture by passing a stream of warm air over the bed or by mixing dried bicarbonate with the bed. Then the carbonation is completed.

In one mode of practicing the invention, sufficient dry bicarbonate product or product fines are mixed with the damp material after each carbonation stage to reduce the moisture content below the level inducing any additional aggregation. The ratio of recycled dry material depends on the initial ratio of water to ash in the hydrate and varies from substantially zero up to 5 times as much recycle as product from the process. Balling of the grain in the bed due to excessive moisture also reduces the contact area between the solids and the carbon dioxide, slowing the $CO_2$ absorption rate.

Two stages of carbonation with one stage of moisture reduction are usually ample to produce quality product of the desired size particles. Any additional number of alternating stages of carbonation and moisture reduction are also suitably used.

For product quality control, the granular material is screened to remove both oversize and undersize material. Crushed oversize together with the fines are suitably used in partial fulfillment of the dry recycle requirements for the final stage of carbonation of the hydrated ash or for cementing the damp ash in the carbonation to form aggregates of the desired size in the final product.

Partial carbonation of the hydrated ash also provides for the production of mixtures of sodium carbonate and sodium bicarbonate, including the sesqui-carbonate containing the carbonate and bicarbonate in a 1/1 molar ratio or Wegscheider's salt containing the carbonate and bicarbonate in a 1/3 molar ratio.

Particles formed by partial carbonation and subsequent drying are harder and less subject to dusting by abrasion or attrition than particles of equivalent density formed by direct dehydration of agglomerated hydrates.

Partial carbonation forms low-density, hollow-core granules with hard dense shells whereas direct dehydration of agglomerated hydrates produces particles with a solid core structure. The distributed porosity of the latter lowers the density, softens the surface and increases susceptibility to degradation by abrasion which is objectionable in a commercial product. In contrast, the harder, stronger, and dust-free granules of sodium carbonate of this invention are readily acceptable for commercial use.

Sodium carbonate derived from the calcination of bicarbonate can be hardened by prolonged heating or calcination at high temperatures. Likewise the coarse, low-density, hollow-core particles produced by the method of this invention, particularly compositions consisting largely of sodium carbonate, are also suitably hardened by additional thermal treatments as required to yield a hard-surfaced, dust-free product.

The coarse, low-density, hollow-core particles of bicarbonate or carbonate-bicarbonate are calcined to sodium carbonate or are partially calcined to carbonate-bicarbonate mixtures without changing their physical shape to form coarse, low-density, hollow-core particles having apparent density from about 15 to 30 lb./ft.$^3$. Normal temperatures for calcining bicarbonate to carbonate, from 60° to 400° C., are suitable using known equipment and procedures. The volatilized $CO_2$ resulting from the calcination of the bicarbonate granules is suitably utilized for carbonation of the hydrated soda as described above.

When coarse particles are desired having apparent density from 25 to 40 lb./ft.$^3$, particles of lower density are densified by impregnation with concentrated solutions of $Na_2CO_3$ applied in suitably atomised or otherwise distributed form while volatilizing the solvent water. Suitably the lower density particles are sprayed with the soda ash solution while tumbling in a stream of hot air to evaporate the water, avoiding any substantial dissolution or caking of the granules. This is suitably carried out in a conventional rotary or fluid bed dryer. Final drying produces densified granules. Suitable temperatures in the spraying operation are from 30 to 100° C. and in the final drying operation are from 60 to 400° C. Suitable concentrations of the soda ash solution are up to saturation with means for avoiding crystallization in the spray nozzles or preferably from 5 to 32 percent by weight for easier handling. The soda ash solutions are at any desired temperature as introduced but advantageously are from 10 to 105° C.

Figure 2:
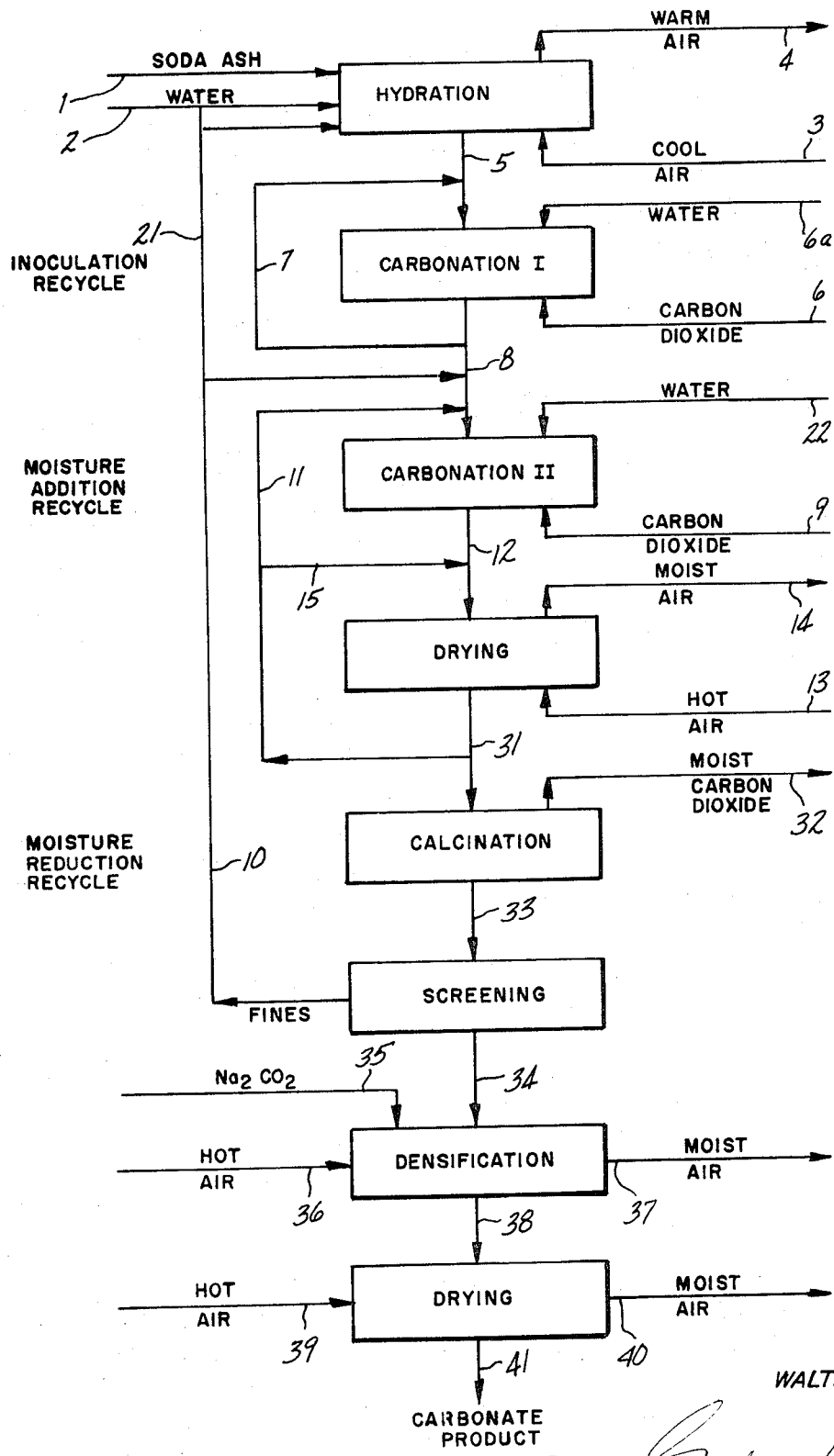

Accompanying FIG. 1 shows a flow sheet of the process of the invention for producing coarse, hollow spheres of soda ash having apparent density of 15 to 30 lb./ft.$^3$. FIG. 2 shows a flow sheet of the process of the invention for producing coarse particles of soda ash having apparent density of 25 to 40 lb./ft.$^3$. The steps for producing hollow spheres of bicarbonate or carbonate-bicarbonate mixtures through the first drying step are the same in FIGS. 1 and 2.

In the hydration step in FIG. 1, fine soda ash is introduced via line 1 and water via line 2 to agglomerate the fine ash into hydrated particles of approximately the size required for the final bicarbonate product. Bicarbonate fines are suitably recycled via line 21 and incorporated in the hydration mixture either directly via line 23 or by disolving the fines in the water used for hydration using line 24. Heat released during the hydration of the soda is removed by circulation of air into the hydration mixture via line 3 and out via line 4 to maintain the temperature below the decomposition temperature of the hydrate. Screens and crushers (not shown) are associated with the agglomeration drum to size the hydrated agglomerate to that desired for the final product.

Hydrated ash from the hydration is conveyed via line 5 to the intitial carbonation stage, suitably in a horizontal rotating drum for tumbling the granular hydrate to expose it effectively to the $CO_2$ introduced into the drum atmosphere via line 6. The $CO_2$ is suitably warm, either dry or humidified $CO_2$. Alternatively, a limited amount of water is injected via line 6a. An inoculation recycle stream of warm, damp, partially carbonated material is suitably fed to the initial stage of carbonation via line 7 to provide the moisture and/or temperature required to induce rapid $CO_2$ absorption in this stage of the process. Partially carbonated ash is transferred via transfer line 8 to the final carbonation stage. Carbon dioxide is introduced to carbonation Stage II via line 9.

Between the two carbonation stages, recycle fines are introduced via line 10 and partially dried bicarbonate via line 11 into transfer line 8 as necessary to maintain suitable moisture content in the final carbonation stage. The fully or partially carbonated product is transferred via line 12 to the first stage drier where heated air introduced via line 13 rapidly removes most of the free moisture via line 14. Partially dried material is transferred to drying stage II via line 16. A portion of the partially dried bicarbonate is suitably recycled to drying stage I via line 15 to further reduce the moisture content of the feed to the drier.

An alternative to the use of partially carbonated damp ash for initiating $CO_2$ absorption is direct injection of a small amount of "trigger" water via line 22. The "trigger" water is suitably in the form of water alone or a solution of sodium bicarbonate fines. When "trigger" water is injected via line 22, then line 7 for recycle of damp, partially carbonated ash is ordinarily not necessary and the carbonation is suitably conducted in a single stage.

In drying stage II, carbon dioxide is introduced via line 17 and moisture is removed via line 18. Dried bicarbonate is transferred via line 19 to screens, fines are recycled via line 10 and bicarbonate of the desired size is transferred via line 20 to calcination. Carbon dioxide evolved from the calcination exits via line 30. The calcined product is transferred to screens via line 27, fines are recycled via line 28 and product of the desired size is removed via line 29. Bypass line 25 is provided for adjusting the ratio of carbonate to bicarbonate in mixed products by the transfer of bicarbonate containing material to the final screening. Also screening of the bicarbonate product is omitted, when unnecessary, using bypass line 26.

According to FIG. 2, the embodiment contemplates calcining after a single drying step, the dried material being transferred via line 31. Moist carbon dioxide evolved exits via line 32. The coarse, hollow sphere soda ash is transferred via line 33 to screens and fines are recycled via line 10. Carbonate of the desired size is transferred via line 34 to the densification using sodium carbonate solution introduced via line 35. Drying is effected during densification by introducing hot air via line 35 and removing moist air via line 37. The densified soda ash is transferred via line 39, removing moist air via line 40. The product having a density of 25 to 40 lb./ft.$^3$ is removed via line 41.

In the carbonation step, free solution is liberated by heating the hydrate to the decomposition temperature which promotes prompt and rapid absorption of $CO_2$. Once $CO_2$ absorption has been initiated, conversion of the hydrate to trona and sodium bicarbonate releases additional quantities of free moisture from the hydrate, assuring propagation of the carbonation reaction throughout the granule.

Although carbonation is suitably effected in a single stage, it is preferably effected in at least two stages for optimization of the structural strength of the final product. In the first stage, a temperature insensitive shell of trona or mixtures of trona and sodium bicarbonate encase the hydrated agglomerate. The absorption of $CO_2$ by the hydrate to form trona is endothermic and the temperature of the mass declines and is maintained at a temperature below 35.4° C. in the first stage of carbonation. As trona is carbonated further to form bicarbonate, the reaction becomes exothermic and the temperature increases above 35.4° C. At this point the reaction mass is suitably transferred to carbonation stage II and the temperature is maintained above 35.4° C. for a sufficient time to permit the fusible hydrates in the core of the agglomerate to liquefy and diffuse to the surface of the particle. Exposure of these carbonate solutions to $CO_2$ atmosphere at the surface of the particle results in immediate re-solidification as trona and bicarbonate forming a hollow core. Where a product with a high proportion of bicarbonate is desired for the final product, carbonation in stage II is suitably continued to complete saturation of the granule with $CO_2$ and drying is effected at relatively low temperatures in a $CO_2$ atmosphere to avoid the decomposition of the sodium bicarbonate. For the objects of the present invention it is only necessary that carbonation be sufficient to insensitize the granule to drying temperatures in excess of the 35.4° C. decomposition temperature of the heptahydrate. Producing a final composition equivalent to trona is achieved with carbonation slightly beyond this composition to elevate the bed temperature above 35.4° C. for a sufficient time to permit the hydrate in the core to liquefy and diffuse to the surface. Once the hollow core structure has formed, no further carbonation is necessary provided the ratio of bicarbonate to carbonate is at least equal to that desired in the final product.

Dry carbonates are recycled to the final stage of carbonation to maintain moisture concentration well below the balling or caking limit of the mass in the carbonator but still sufficiently high to promote rapid carbon dioxide absorption by the mass.

In the drying stages, dry bicarbonate is recycled to the dryer to limit the moisture concentration of the material in the dryer to concentrations below the balling and caking limit. Where lower ratios of bicarbonate to carbonate are desired and where low-density, granular sodium carbonate is desired, excess bicarbonate is decomposed by calcination at relatively high temperatures. Carbon dioxide liberated by calcination is recycled to carbonation stages.

In forming hydrated agglomerates, variations of appreciable magnitude are permissible in the initial ratio of water to soda ash. Decahydrate with 10 moles of water per mole of ash is a practical upper limit. At the lower limit at least 1.5 moles of water per mole of $Na_2CO_3$ must be present to form agglomerates and to promote prompt and rapid absorption of the $CO_2$ at the intermediate trona stage of carbonation. Generally 2 to 4 moles of water are satisfactory to establish the desired physical form of the finished product without increasing drying costs by introducing excessive amounts of water.

Substantial variations in the ratio of $CO_2$ absorbed by the agglomerates below 35.4° C. and above this reference temperature can also be tolerated. Longer times below 35.4° C. can be held by transferring the hydrate carbonation stage I at the lowest practical temperature. Thicker initial shells are thereby formed with less residual hydrate or liquefaction and diffusion to the surface in the ensuing stage of carbonation. Excessively short holding time in stage I sometimes result in delicate shell structures and granule degradation in carbonation stage II. Final products of lower density result from shorter holding times in carbonation stage I. The transfer between carbonation stages I and II is a compromise between lower density of the final product and loss of product by degradation.

Suitably, equipment is designed for continuous feed and withdrawal of intermediate products from each stage of the process. However, batch equipment is also suitable for formation of the desired hollow grain particles.

The accompanying figure shows a plurality of stages with material transfer between stages. Other embodiments of the process are also contemplated in which a single rotating drum is equipped with lines for practicing the several stages therein consecutively. Hydration of soda ash by water injection, partial carbonation, intermediate drying by hot air with introduction of recycle fines, complete carbonation, drying and calcination are all suitably accomplished in a single drum, discharging the product to sieves. Also contemplated is single stage complete carbonation with continuous or intermittent drying and/or recycle of dry fines and single stage drying first with hot air and later with $CO_2$ at lower temperatures.

Completely continuous operation is contemplated in which the hydrated soda ash is continuously formed by hydrating dry soda ash; the hydrated soda ash is continuously carbonated in a first carbonation stage with 30 to 50 percent of the carbon dioxide required for complete carbonation; the free moisture is introduced by recycle damp carbonation ash; the percent of free moisture is continuously maintained by incorporating dry sodium bicarbonate; continuously completing the carbonation of the reaction mixture; continuously volatilizing the free moisture from the resulting completely carbonated reaction mixture and continuously calcining; thereby continuously producing sodium carbonate having the desired bulk density and particle size.

Table I shows typical quantities of major components of the process in related lines of FIG. 1. For 1000 pounds of bicarbonate product, 630 pounds of ash is introduced via line 1. The water of hydration required to form the heptahydrate is 750 pounds introduced via line 2. Half the required carbon dioxide, 131 pounds, is introduced via line 6 to carbonate the 1380 pounds of heptahydrate introduced into the first carbonation stage via line 5. The resulting damp, partially carbonated material is transferred via line 8 to carbonation stage II with dry recycled fines from line 10. About 928 pounds of this recycle is required to increase the bed weight to 2570 pounds and to maintain the free moisture content at complete carbonation at about 25 percent. This maintains the integrity of the initial grain structure and prevents the grain in the bed from balling. Additional carbon dioxide is introduced via line 9. The 1000 pounds of fully carbonated product containing 642 pounds of water is transferred via line 12 to the first stage dryer. Substantially all the water is removed via line 14 from the first stage dryer and only minor amounts from the second stage dryer. Sodium carbonate produced and removed by line 29 amounts to 631 pounds while 107 pounds of water and 262 pounds of carbon dioxide are removed via line 30. These amounts show throughput excluding amounts recycled.

TABLE I.—FLOW RATES OF MAJOR COMPONENTS EXCLUSIVE OR RECYCLE STREAMS

[Basis: 1,000 pounds $NaHCO_3$]

| Component/line | 1 | 2 | 5 | 6 | 8 |
|---|---|---|---|---|---|
| Ash ($Na_2CO_3$) | 630 | | | | |
| Water | | 750 | | | 321 |
| $CO_2$ | | | | 131 | |
| Ash (hydrated) | | | 1,380 | | 690 |
| $NaHCO_3$ | | | | | 500 |

| Component/line | 9 | 12 | 14 | 29 | 30 |
|---|---|---|---|---|---|
| Ash ($Na_2CO_3$) | | | | | |
| Water | | 642 | 642 | | 107 |
| $CO_2$ | 131 | | | | 262 |
| Ash (hydrated) | | | | | |
| $NaHCO_3$ | | 1,000 | | | |
| $Na_2CO_3$ | | | | 631 | |

The product of this invention is a novel form of sodium carbonate having apparent densities of 15 to 40 pounds per cubic foot. The densities are readily controlled to any desired specifications within these ranges. Many densities within the range have not previously been available in the form of coarse rapidly dissolving particles which are especially suitable for use in detergent compositions.

EXAMPLE I

Two pounds (0.017 pound moles) of minus 6 plus 10-mesh hydrated soda ash having a density of 40 pounds per cubic foot and containing 4.5 moles of water per mole of $Na_2CO_3$ were treated with 0.025 pound of $CO_2$ in a rotary drum 10 inches in diameter and 12 inches long turning at 36 r.p.m. and maintained at 30° C. A small amount of water was initially injected to trigger the adsorption of the $CO_2$. As carbonation progressed, the bed became damp due to the release of water of hydration of the soda ash. Warm dry air was circulated through the drum as required to reduce the moisture content and to prevent balling of the granular soda ash. Carbonation was continued at 40° C. with an additional 0.025 pound moles of $CO_2$. The carbonated material was then dried and calcined to a temperature of 290° C. to volatilize all $CO_2$ in excess of that required for $Na_2CO_3$. The minus 6 plus 10-mesh recovered hollow core sodium carbonate had a density of 27 pounds per cubic foot.

EXAMPLE II

Dry, low-density granular sodium carbonate with a density of 27 pounds per cubic foot, prepared as described in Example I was moistened with 30 percent by weight of concentrated soda solution containing 25 percent of $Na_2CO_3$. The solvent water was then volatilized by drying. The dried product had apparent density of 29.0 pounds per cubic foot. The treatment was repeated on the 29.0 pound product. After the second impregnation with 30 percent of concentrated solution and subsequent drying, the bulk density was elevated to 31.2 pounds per cubic foot.

EXAMPLE III

Hydration

A drum 3 feet in diameter and 6 feet long rotating at 15 r.p.m. about its horizontal axis was charged with a bed of 100 pounds of hydrated soda ash having particles less than 30-mesh in size. Attached to the interior wall of the drum were 16 radial flights 1 inch high to prevent the bed from skidding on the interior walls as the drum was rotated. Because of these flights the bed was also elevated and cascaded. An atomizing spray was located mid-way of the drum and was off-set from the axis away from the bed. The spray directed atomized water transversely into the cascading curtains of granular hydrated soda ash at the rate of 80 lbs./hr. Anhydrous sodium carbonate was fed to the bed continuously or in small, frequent increments at rates from 65 to 100 lbs./hr. thereby varying the mole ratio of water to sodium carbonate from 7.2/1 to 4.7/1. The temperature of the bed was maintained below 32° C., the decomposition temperature of the decahydrate, by the circulation of cool ambient air at 20 to 25° C. through the drum as the hydration progressed. The discharge from the end of the drum was circulated at from 10 to 20 lbs./min. over 30 and 40-mesh screens in series. The plus 30-mesh oversize was fed to a crusher and reduced to minus 30-mesh and recycled to the screens. The minus 30-mesh plus 40-mesh fraction was taken as product. The minus 40-mesh fraction was recycled to the feed end of the drum to provide nuclei for further growth. Under these conditions, about 1 pound of minus 40-mesh undersize was recycled to the feed end of the hydration drum for each pound of product removed. This recycle, together with the anhydrous soda fed directly to the bed, sustained the volume of the bed at the 100 pound starting level and permitted continuous, steady state operation.

Carbonation

A drum 3 feet in diameter and 6 feet long rotating at 5 r.p.m. about its horizontal axis and preheated to 45° C. was charged with a bed of 100 pounds of hydrated soda ash having particles in the range minus 30-mesh plus 40-mesh. The ratio of water to sodium carbonate in the hydrated soda ash was 4.7/1. One end of the drum was sealed with a removable transparent cover and the other was sealed except for an opening to admit concentric ducts for the circulation of heated drying air through the interior of the drum. Attached to the interior surface of the drum were 16 radial flights 1 inch high to prevent skidding of the bed and to provide for elevation and cascade of material in the bed. Provision was also made for injection of $CO_2$ into the drum atmosphere. As the hydrate was transferred into the warm drum, $CO_2$ was also admitted. Sufficient of the cool hydrate, in contact with the warm drum was heated to the transition temperature of 35.4° C. to release water of hydration and initiate absorption of $CO_2$, forming a shell of trona on the surface of the hydrate particles. $CO_2$ was injected intermittently at rates of 0.5 to 1 lb./min. until substantially all of the hydrate particles were covered by a shell of trona.

These changes were indicated by reversal of temperature trends in the bed. During injection of the initial 5 pounds of $CO_2$, equivalent to approximately 25 percent of the total $CO_2$ requirement, the bed temperature dropped from 35.4° C. to 26° C. due to the endothermic absorption of $CO_2$ to form trona. Carbonation was continued until it exceeded the trona composition at the surface of the particles. The exothermic absorption of $CO_2$ to form bicarbonate raised the bed temperature to 35.4° C. The cumulative absorption at this point was 7 pounds of $CO_2$, equivalent to approximately 30 percent of the total $CO_2$ requirement.

When 50 percent of the total $CO_2$ was absorbed, the bed temperature was 55° C. and the bed moisture level was sufficient to induce sticking and incipient balling. Warm air circulation to the bed reduced the bed temperature to 40° C. within 2 minutes by volatilization of moisture. Addition of 50 pounds of dry minus 40-mesh bicarbonate fines raised the bicarbonate in the bed to 138 pounds on an anhydrous basis and reduced the moisture content to 19.5 percent, below the limit at which excessive balling and adhesion occurs. Further injection of $CO_2$ was continued until the bed temperature again approximated 55° C., followed by cooling to 40° C. After a third cooling cycle, analysis indicated that the bed was fully carbonated by the injection of a total of 23 pounds of $CO_2$. Total exposure time of carbonation was 1 hour.

Free moisture was volatilized from the stationary bed in the drum by circulating dry air heated to 60° C. and carrying 15 percent of $CO_2$. Further agitation was avoided but the bed was shifted by one-half turn of the drum at 10 minute intervals. After 8 hours, the moisture content of the bed was less than 1 percent. The product was then rescreened to recover the minus 30- plus 40-mesh fraction which amounted to 65 pounds of sodium bicarbonate having a bulk density of 25 pounds per cubic foot. Microscopic examination showed beads having a smooth, continuous outer shell with a hollow core. The remainder of the bed consisted of 73 pounds of minus 40-mesh fines including 50 pounds of fines mixed into the bed during carbonation. The theoretical yield of minus 30- plus 40-mesh product recoverable from the 100 pounds of minus 30- plus 40-mesh starting hydrate was 88 pounds. Actual yield was about 79 percent of theory. Breakage of the hollow core grains during the final stages of carbonation of the hydrated soda and the drying of the carbonated product accounts for the balance.

The low density, minus 30- plus 40-mesh granular sodium bicarbonate of hollow core structure and bulk density of 25 pounds/cu. ft. was decarbonated by heating to 150° C. for 30 minutes. The recovered product was also minus 30- plus 40-mesh in size and had a bulk density of 16 pounds per cubic foot. This reduction in density is accounted for by the loss in weight of the original bicarbonate due to volatilization of the $CO_2$ and $H_2O$.

What is claimed is:

1. A method for producing coarse, light sodium carbonate compositions having bulk density from 15 to 40 pounds per cubic foot and particle size plus 100 mesh U.S. Standard screens by carbonating hydrated soda ash having particle size plus 100 mesh with gaseous carbon dioxide while maintaining from 0.001 to 30 percent by weight of free moisture in the reaction mixture until said reaction mixture is enriched in sodium bicarbonate, volatilizing said free mosture to form a dry product enriched in sodium bicarbonate and having said particle size, calcining said dry product to form a sodium carbonate enriched product having said particle size and bulk density.

2. Method as claimed in claim 1 in which said sodium carbonate product has a bulk density from 15 to 30 pounds per cubic foot and is further densified by wetting with aqueous sodium carbonate and drying to produce sodium carbonate of the same particle size having an increased bulk density from 25 to 40 pounds per cubic foot.

3. Method as claimed in claim 1 in which said calcining is incomplete and the resulting composition is a mixture of sodium carbonate and sodium bicarbonate.

4. Method as claimed in claim 1 in which said free moisture is introduced by adding water to dry soda ash in excess of the amount required to form said hydrated soda ash.

5. Method as claimed in claim 1 in which said free moisture is introduced by adding damp, carbonated, hydrated ash.

6. Method as claimed in claim 1 in which said free moisture is introduced by heating said hydrated ash above the temperature of transition of said hydrated ash to a lower hydrate.

7. Method as claimed in claim 1 in which said hydrated soda ash contains from 1 to 10 mols of crystal water per mol of soda ash.

8. Method as claimed in claim 7 in which said hydrated soda ash is formed by hydrating dry soda ash at temperatures below 109° C.

9. Method as claimed in claim 8 in which said hydrated soda ash is formed by hydrating dry soda ash at temperatures below 35.4° C. and said hydrated soda ash contains from 7 to 10 moles of crystal water per mol of soda ash.

10. Method as claimed in claim 1 in which said free moisture is volatilized simultaneously while carbonating said hydrated soda ash.

11. Method as claimed in claim 1 in which haid hydrated soda ash is continuously formed by hydrating dry soda ash; said hydrated soda ash is continuously carbonated in a first carbonation stage with 30 to 50 percent of the carbon dioxide required for complete carbonation; said free moisture is introduced by recycling damp carbonated ash; said percent of free moisture is continuously maintained by incorporating dry sodium bicarbonate; further continuously carbonating said reaction mixture; continuosly volatilizing said free moisture from the resulting carbonated reaction mixture; thereby continuously producing sodium bicarbonate having said particle size and continuously calcining the resulting bicarbonate to form sodium carbonate having said particle size and bulk density.

References Cited
UNITED STATES PATENTS

| | | | |
|---|---|---|---|
| 1,921,505 | 8/1933 | Chesny | 23—63 |
| 3,188,170 | 6/1965 | Mantz | 23—63 |
| 3,232,701 | 2/1966 | Hansen et al. | 23—63 |

GEORGE O. PETERS, Primary Examiner

U.S. Cl. X.R.

423—427